United States Patent [19]

Meyers et al.

[11] 4,068,232
[45] Jan. 10, 1978

[54] PASSIVE ENCODING MICROWAVE TRANSPONDER

[75] Inventors: Thomas D. Meyers, New Windsor; Ashley P. Leigh, Gaithersburg, both of Md.

[73] Assignee: Fairchild Industries, Inc., Germantown, Md.

[21] Appl. No.: 657,467

[22] Filed: Feb. 12, 1976

[51] Int. Cl.² .......................................... H01R 39/00
[52] U.S. Cl. ............................. 343/6.8 R; 343/6.8 LC
[58] Field of Search ....................... 343/6.8 R, 6.8 LC

[56] References Cited

U.S. PATENT DOCUMENTS

| | | | |
|---|---|---|---|
| 3,389,391 | 6/1968 | Keeler et al. | 343/6.8 R |
| 3,689,885 | 9/1972 | Kaplan et al. | 343/6.8 LC |
| 3,806,905 | 4/1974 | Strenglein | 343/6.8 R |
| 3,859,624 | 1/1975 | Kriofsky | 343/6.8 R |
| 3,914,762 | 10/1975 | Klensch | 343/6.8 LC |
| 3,944,928 | 3/1976 | Augenblick | 343/6.8 R |
| 3,964,024 | 6/1976 | Hutton et al. | 343/6.8 LC |

*Primary Examiner*—Brooks H. Hunt
*Attorney, Agent, or Firm*—Michael W. York

[57] ABSTRACT

A passive transponder which provides remote identification of objects including cargo and trailers, vehicles or a variety of objects which move through an interrogator beam. The passive transponder is mounted onto the vehicle or object or at the location to be identified. A transmitted beam from the interrogator is directed to the transponder. Some of the beam's energy is rectified and used to power digital electronic circuitry within the transponder which generates a signal with a serially-coded digital waveform. This signal amplitude modulates a harmonic generator in the transponder which produces and emits harmonic energy derived from the incident beam from the interrogator. This harmonic energy is readily identified by an interrogator receiver which is tuned to that harmonic of the incident signal. The transponder information from the interrogator receiver is decoded in the interrogator data processor to provide the desired identification number. An internal clock frequency is generated within the passive transponder as a result of transmitted energy from the interrogator beam, and this clock determines the read-out rate of the encoded data from a field programmable read-only memory.

20 Claims, 6 Drawing Figures

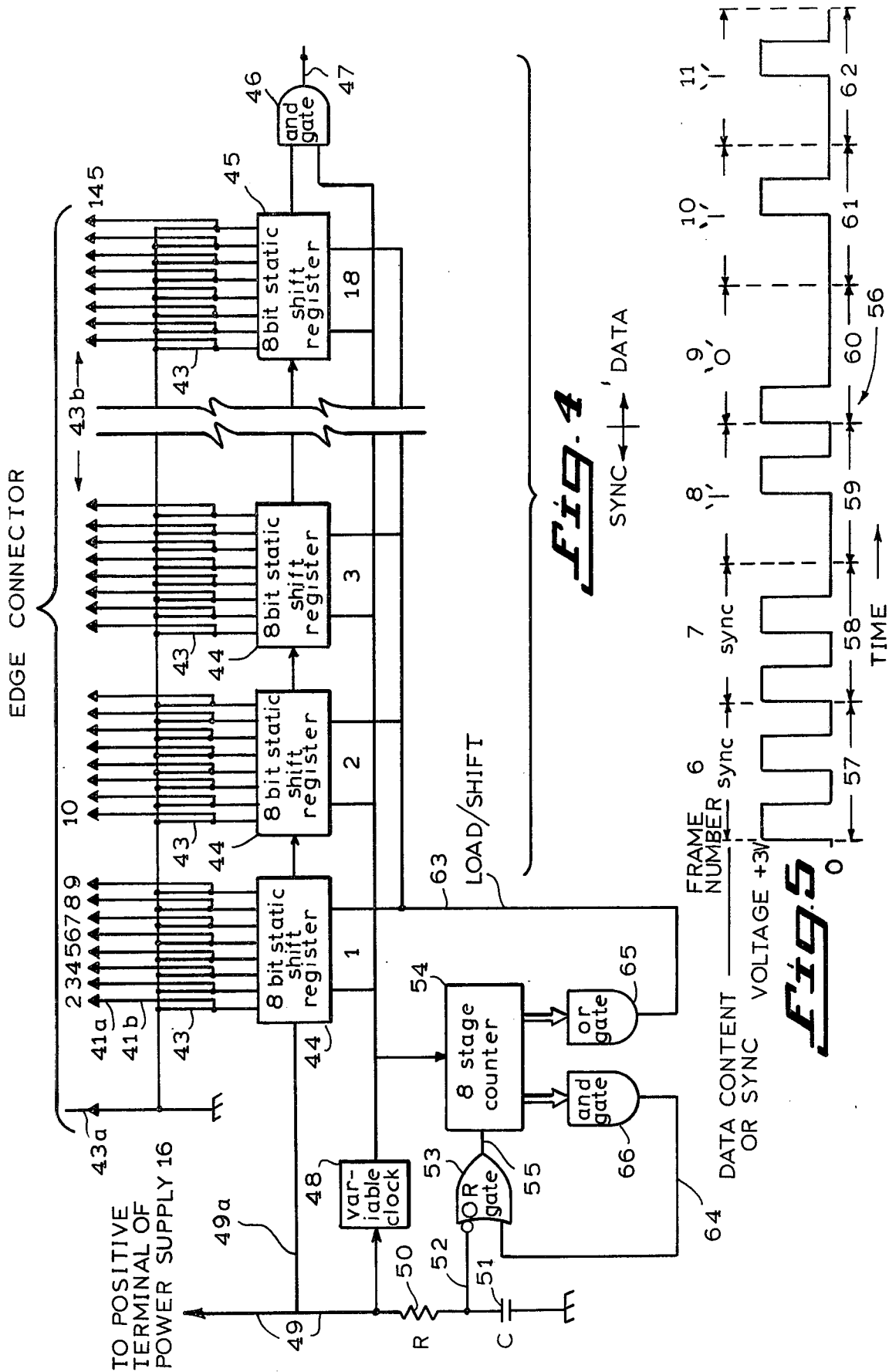

PASSIVE ENCODING MICROWAVE TRANSPONDER

BACKGROUND OF THE INVENTION

At the present time there exist various devices for vehicle location, vehicle identification and cargo identification. These devices have required a large variety of hardware to obtain automatic identification or location of the vehicle or cargo. In some devices or systems optical techniques have been employed. However, these are susceptible to errors caused by misorientation and foreign matter on the interrogator or label.

A large number of RF systems have been devised over the years. However, these too have many serious shortcomings. Many rely upon reflecting the fundamental frequency or altering its polarization or phase. These techniques suffer from practical problems involving sensitivity of the equipment and the likelihook of false alarms. In addition, if multiple frequency codes are used, large amounts of spectrum may be required to convey a complex digital identification number. One alternative to this is some form of mechanical scanning which several of the previous systems or devices have utilized. However, these techniques require the same alignment restrictions as the previous optical techniques and are therefore unsatisfactory for many road vehicle and cargo applications. Some others of these systems or devices use serially encoded information; however, they suffer from problems of practicality. For instance, some such systems or devices use either a core memory or a magnetic disc which is motor-driven to store the identification information; however, the power levels present in a radiation-powered transponder are usually insufficient to operate these systems or devices in a satisfactory manner. Finally, there is a class of RF devices which uses one or more solid-state oscillators which are modulated by coded information and which are powered by incident RF energy or from a battery. While these systems or devices do not have some of the previous shortcomings, their transmitters require more DC power and they are complicated and costly.

The present invention overcomes all these foregoing disadvantages and provides a simple, inexpensive, small, passive transponder which may be readily mounted in many orientations on the object to be identified and permits unambiguous identification and reception of the transponder signal and a method of using such a transponder.

BRIEF DESCRIPTION OF THE INVENTION

This invention relates to marking apparatus and more particularly to marking apparatus for marking objects with a transponder for the purpose of transmitting identifying information about an object or its location.

It is an object of the present invention to provide an apparatus for obtaining identification information from an object.

It is an object of the present invention to provide an apparatus for detecting a moving object.

It is an object of the present invention to provide an apparatus for obtaining identification information from a moving object such as a vehicle.

It is an object of the present invention to provide an apparatus for identifying the location of a vehicle or other object based upon receipt of coded information from a transponder used as a position identifying sign.

It is an object of the present invention to provide an apparatus which permits obtaining information about an object without regard to accurate orientation or alignment of the article to be monitored.

It is an object of the present invention to provide an apparatus for obtaining information by coding this information into the apparatus and through modulation of a return signal to an interrogator.

It is also an object of the present invention to provide an apparatus for obtaining information in which the rate at which the information is transmitted is varied to accommodate range and signal-to-noise conditions.

It is also an object of the present invention to provide a transponder apparatus for generating a harmonic return signal using passive techniques from the fundamental signal incident on the transponder.

It is also an object of the present invention to provide a transponder apparatus for obtaining power for the operation of the electronic components within the transponder.

It is also an object of the present invention to provide a transponder apparatus for generating synchronization information at the beginning of the transponder message.

It is also an object of the present invention to provide a transponder apparatus for communicating sensor or status data from the transponder using digital coding.

BRIEF DESCRIPTION OF THE DRAWINGS

The invention will be hereinafter more fully described with reference to the accompanying drawings in which:

FIG. 3 is an exploded detailed view of the circuitry of the passive transponder of FIG. 2 used to receive the incident beam and generate harmonic energy including a harmonic generator, the power supply structure and logic circuitry;

FIG. 4 is a circuit diagram of the logic circuitry which comprises the clock and control circuitry, the ROM and the modulator in FIG. 2;

FIG. 5 is a typical split phase bit stream waveform that is generated by the circuitry illustrated in FIG. 4 and fed to the modulator.

DETAILED DESCRIPTION OF THE PREFERRED EMBODIMENT

Figure 1:
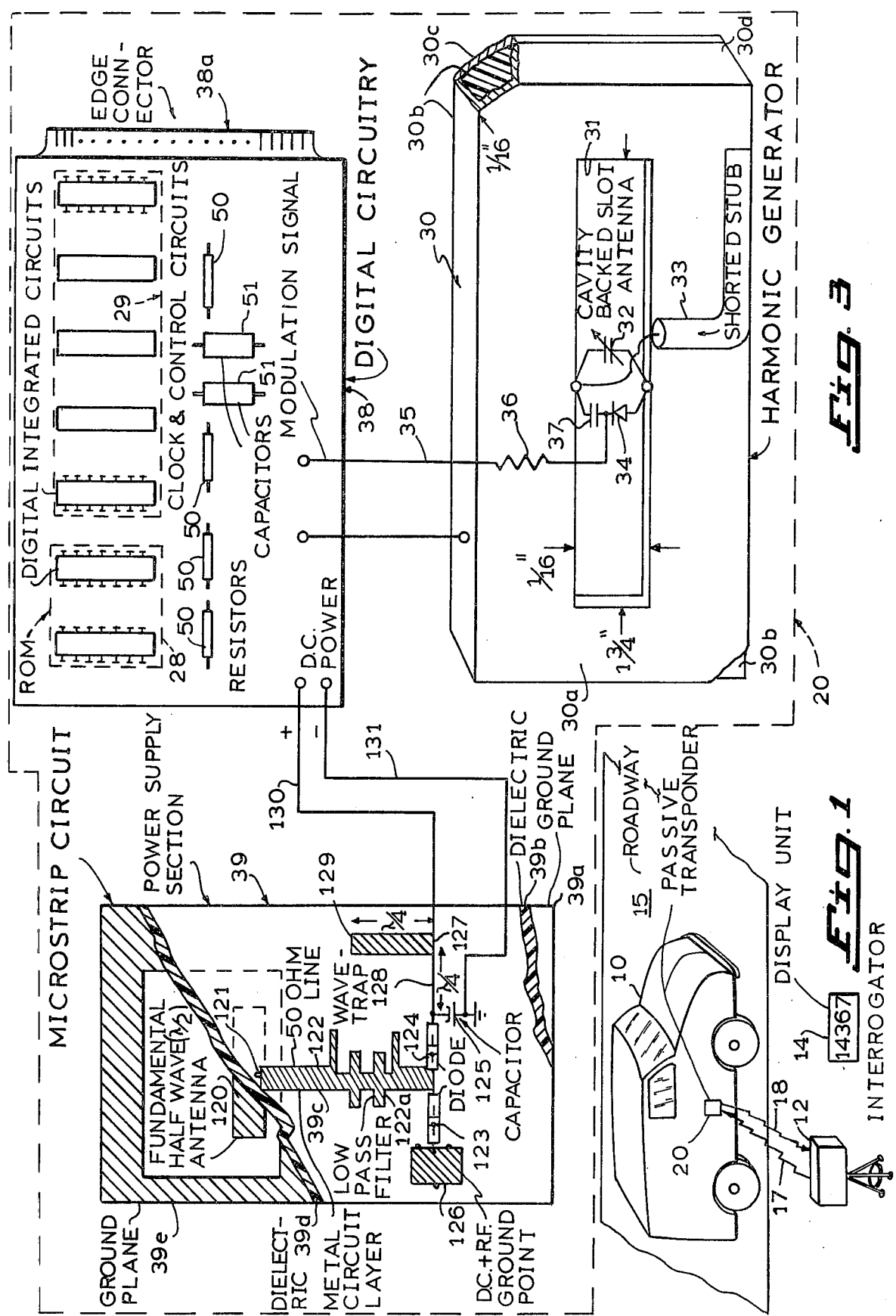
FIG. 1 is a drawing showing the use of the passive transponder of the present invention with an interrogator in a vehicle identification application.

Referring to FIG. 1 a truck 10 is proceeding along a roadway 15 and passes through an interrogator beam 17 from the interrogator 12. Energy from this beam is incident upon a passive transponder 20 which uses a portion of that beam energy to provide power for circuity contained within the transponder 20. The transponder 20 which received the incident beam 17 from the interrogator passively generates and transmits harmonic energy to the interrogator in the form of a beam 18. The harmonic response from the transponder 20 is keyed on and off according to a pre-programmed serial digital code which is stored in and read out by digital circuitry in the transponder 20 in a manner which will be more fully described hereinafter. This digital circuitry is powered by a portion of the beam 17 energy from the interrogator.

The coded response beam 18 from the transponder 20 is received, detected and decoded within the interrogator 12. The decoded information is presented on a display unit 14 which is connected to the interrogator 12 and may be visual or which may input written or electronic data to an automatic security or billing system. The number may be a multi-digit alpha-numeric character and the display can be utilized to convey the identity or class of the vehicle or its cargo.

Figure 2:
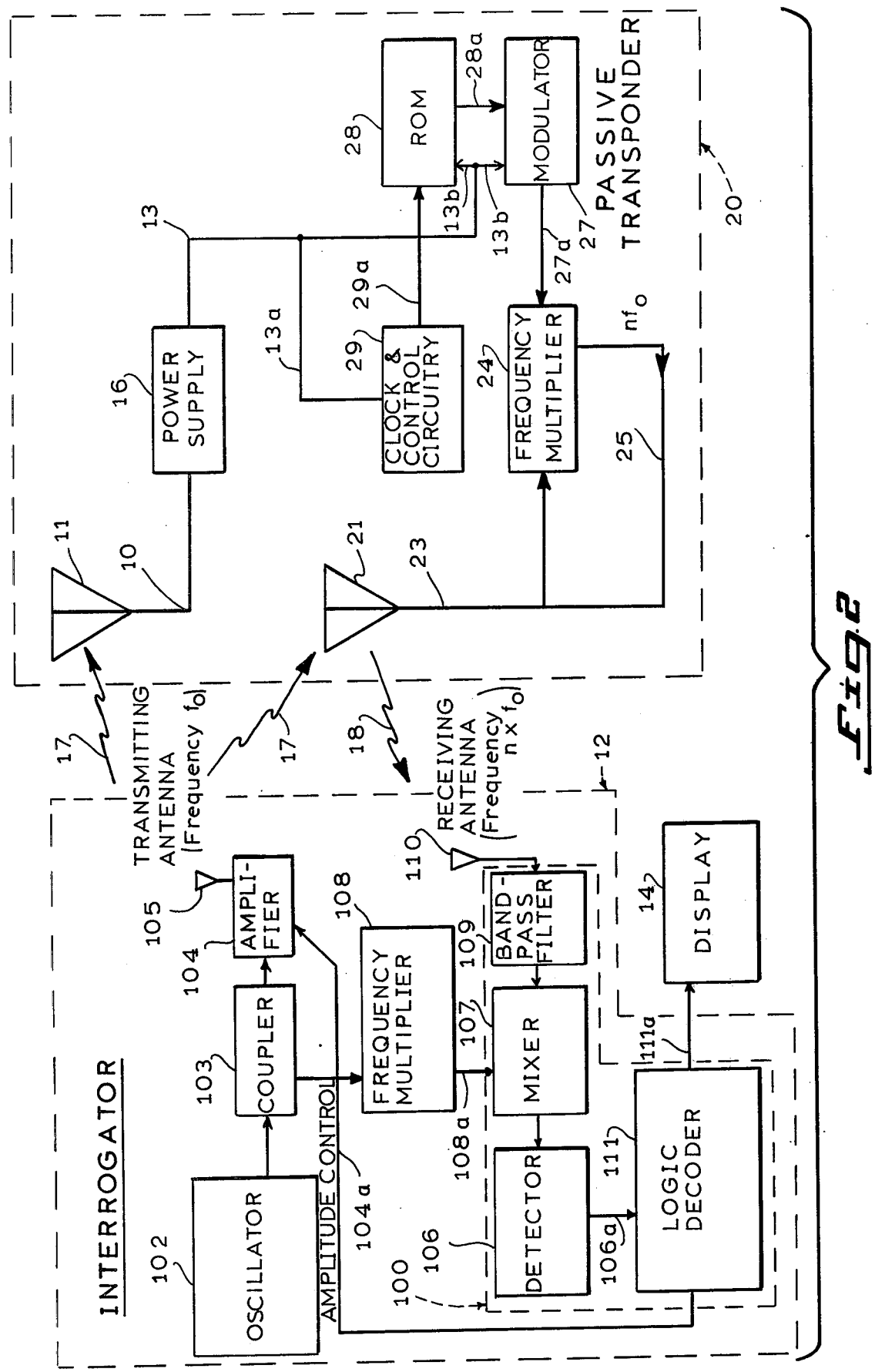
FIG. 2 is a circuit diagram of a portion of the structure illustrated in FIG. 1 showing the passive transponder and an interrogator useable in a vehicle identification application.

Referring to FIG. 2 the system utilized in FIG. 1 includes an interrogator 12, a passive transponder 20 and a display unit 14. The interrogator 12 contains an oscillator 102 which generates the fundamental frequency for the transmitter beam 17. Some of this signal is sampled by the coupler 103 for use in the receiver section 100 of the interrogator. Most of the oscillator 102 output proceeds through the coupler 103 to a power amplifier 104 which provides sufficient power (about 50 watts during interrogation) to power the passive transponder 20 by radiated RF energy in the beam 17. The amplified signal is radiated in the beam 17 to the transponder 20 via the transmitter antenna 105 which is connected to amplifier 104.

The beam 17 from the interrogator 12 is received by two antennas 11 and 21 which are part of the transponder 20. The signal from antenna 11 is fed via the lead 0 to impedance matching, filtering and rectifying circuitry which makes up the power supply 16. The output of the power supply 16 is an electrical current with a positive 3–15 volt voltage for operating the clock and control circuitry 29, the ROM (read only memory) 28, and the modulator 27. This current is fed to the control circuitry 29 by the leads 13 and 13a, to the ROM via the lead 13b, and to the modulator 27 via the lead 13b from the ROM 28. The filter capacitor in the transponder power supply 16 is selected to have small enough capacitance to be rapidly charged when a high incident power level signal is received and to provide rapid discharging of the capacitor at the end of interrogation by that signal.

When the power supply 16 voltage is of sufficient magnitude (+3 volts), the clock and control circuit 29 generates pulses which cause the contents of the ROM 28 to be read into the modulator 27 as a serial digital code signal via the lead 28a. The modulator 27 then applies a DC voltage bias via the lead 27a to the frequency multiplier 24 which turns it on and off forming digital "ones" and "zeros" in response to the voltage bias. This DC bias works to de-tune the resonant structure contained within the frequency multiplier 24 and/or reduce the harmonic conversion efficiency of a harmonic generator contained within the frequency multiplier 24. This combination of effects takes place when the modulator 27 keys the frequency mmultiplier 24 off via the lead 27a.

The ROM 28 contains digital data programmed into it which is read out serially on lead 28a into the modulator 27. Each data bit from the ROM 28 is serially read when the ROM 28 receives a clock pulse via lead 29a from the clock and control circuit 29. The clock and control circuit 29 generates clock pulses which are sent to the ROM 28 via lead 29a when a pre-determined threshold voltage is reached on the power supply line 13a. Thus, a certain pre-determined signal level from the interrogator 12 is required to produce the threshold voltage on lead 13a before operation of the clock and control circuit 29 will commence. No information from the read-only memory 28 will be provided for the modulator 27 until clock pulses occur.

The clock and control circuit 29 operating frequency varies by design in proportion to the voltage on lead 13a to provide a means for automatically controlling the signal to noise ratio of the detected signal from the transponder 20 and for increasing the dynamic range of such operation as follows. When a greater energy level is received by the transponder 20 from the interrogator beam 17, a larger voltage is produced from the power supply 16. This greater voltage on lead 13a causes the clock oscillator in the clock and control circuitry to run at a higher frequency. A weak interrogator beam 17 likewise results in a lower clock frequency. At short range (short interrogator 12 to transponder 20 distances) a transponder moving at a given constant velocity will be within the beam for a shorter period of time than at long range owing to the divergence of the interrogator beam, according to the beam width of the tansmitting antenna. Thus, at short range, the transponder data readout rate (clock frequency) is rapid to accommodate the shorter time within the interrogator beam. At long range, the reduced readout rate allows reduced interrogator receiver noise due to the lower data transmission bandwidth resulting in a more constant signal to noise ratio. The receiver bandwith is established by synchronized integrate-and-dump filters in the logic decoder 111. The slower data rate is consistent with the longer time interval during which the transponder is within the interrogator beam at longer range.

When turned on by the signal on the lead 27a, the frequency multiplier 24 receives energy from the interrogator beam 17 via antenna 21 and transmission line 23. A harmonic generator within the frequency multiplier 24 then generates harmonics at a multiple n times the fundamental frequency $f_o$ of the interrogator beam 17 and sends them via the transmission line 25 where they are radiated as the beam 18 by the antenna 21 to the interrogator 101.

The interrogator receiver antenna 110 receives this beam or signal 18 and passes it through a bandpass filter 109 to a mixer 107. The receiver section 100 shown is a modified homodyne type and is comprised of elements 109, 107, 106, 111. The mixer local oscillator frequency on line 108a is substantially identical to the received signal 18 since it differs only due to Dopper shifts and FM noise. This local oscillator signal on line 108a is produced from the sampled energy obtained via the coupler 103 by the frequency multiplier 108 which generates the same harmonic as did the frequency multiplier 24 in the transponder 20.

The mixer 107 mixes the signal from the frequency multiplier 108 with the signal from the band pass filter 109, and delivers a nearly zero frequency output signal to the envelope detector 106. The detector 106 outputs a signal proportional to the digitally coded amplitude of the received signal 18 to the logic decoder 111. The logic decoder 111 uses the detector output signal on lead 106a to generate phase locked clock pulses synchronized to the transponder clock 29. This clock within the logic decoder 111 is then utilized to decode the multidigit serial data from the detector 106 to form a decoded signal on lead 111a which is sent to the display unit 14. The display unit 14 may be an array of light emitting diode alphanumeric characters which visually shows the decoded tag number obtained over lead 111a from the interrogator 12.

The interrogator 12 is made up of conventional microwave and digital components which in themselves are well known to anyone skilled in the art. The transponder logic circuitry represented by the blocks 27, 28, 29, use RCA commercial CMOS digital integrated circuits known for low power consumption which are also well known to anyone skilled in the art. The ROM 28 is a diode matrix memory such as the HM1-0168 manufactured by Harris Semiconductor Corp. of Melbourne, Florida.

FIG. 3 shows a simple frequency multiplying transponder 20. Fundamental energy from an interrogator, such as that labeled 12 in FIG. 2, is coupled into the cavity backed slot antenna 31. The harmonic generator 30 is constructed of a thin metal cavity filled with a dielectric. The harmonic generator 30 is a rectangular shaped laminated structure with thin copper or other suitable outside layers and with a dielectric layer between the copper layers. The harmonic generator 30 also has an outer copper layer with a rectangular slot which exposes the dielectric layer between the metallic layers. The slot 31 serves as an antenna and coupling iris to the harmonic generator 30. The resonant structures are a resonant antenna 31, and a structure consisting of an inductive stub 33 which is a transmission line segment less than a quarter wavelength long which resonates with the parallel combination of a capacitor 32 and the capacitive diode 34 when the slot antenna 31 receives a signal 17 from the interrogator 12. These components 33, 34, 32 are resonant at the fundamental frequency transmitted from the interrogator 12. The exact resonant frequency may be adjusted by varying the variable capacitor 32 which is in parallel with capacitor 37 and the diode 34 which both bridge the cavity 31. The harmonic energy produced by the diode 34 as a result of the signal received by the slot antenna 31 is radiated back to the interrogator 12 illustrated in FIG. 2 via the slot antenna 31. The harmonic energy is generated by the non-linear impedance properties of the diode 34 which produces a non sinusoidal voltage from the fundamental frequency signal current passing through it. This voltage is rich in harmonics of the fundamental frequency.

A positive bias voltage from the digital circuitry 38 is applied to the harmonic generator 30 via the lead 35 and through a current limiting resistor 36 which is connected to the diode 34 and a bypass capacitor 37. The capacitor 37 allows a DC voltage to be impressed across the diode 34, while the low RF impedance of the bypass capacitor 37 allows the diode 34 to receive the full RF voltage across the slot 31. This bias voltage appears across the diode 34 and turns on and off the harmonic output signal by detuning the resonant circuit consisting of elements 32, 33, 34 an/or decreasing the harmonic conversion efficiency of the diode 34. The bias voltage does the former by decreasing the junction capacitance of the diode 34, and the latter by reducing the AC incremental impedance non-linearity of the diode 34.

The digital circuitry 38 is housed on a printed circuit board and contains the clock and control circuitry 29, the ROM 28 and the modulator 27 which were shown in FIG. 2 in block diagram form. The edge connector 38a connects to the ROM and is used for permanently programming it by passing a large programming current through selected pins of the connector.

The final portion of the transponder shown as FIG. 3 is the power supply section 39 which is a microstrip/stripline structure comprising five consecutive layers; an electrically conductive metallic ground plane 39a, a polystyrene dielectric layer 39b, a metallic electrically conductive circuit layer 39c, a polystyrene dielectric layer 39d and an electrically conductive metallic ground plane 39e. The ground plane 39e also contains on one portion a microstrip antenna 120. This antenna is one-half wavelength long at the fundamental frequency of the signal to be received from the interrogator 12 and is coupled via lead 121 upward through the dielectric 39d to the circuit layer 39c. Here at the circuit layer 39c the signal received by the antenna 120 passes down a 50 ohm transmission line 122 to a low pass filter 122a which is, for example, a constant-k, m-derived end section low pass filter such as found on page 113 on *Microwave Engineer's Handbook* Vol. 1, Aertech House, Dedham, Mass. 1971, which is a publication which is well known to those skilled in the art. In using this handbook, the cutoff frequency, $f_c$, should be chosen to be $1.25 f_o$ where $f_o$ is the fundamental frequency of the interrogator beam 17. It is obvious to anyone skilled in the art that the operating frequency $f_o$ may be chosen anywhere within the microwave frequency spectrum. The choice influences the overall size of the passive choice overall transponder. The low pass filter 122a removes all harmonic signals to prevent spurious harmonic generation and radiation by the power supply section 39. The dielectric layers are 1/16 inch thick and the electrically conducting layers are common 1 or 2 ounce copper laminate. The laminated layers of the power supply section 39 are built up as follows. The first layer is a metal ground plane layer 39a directly on top of which is a dielectric layer 39b. Sandwiched between dielectric layers 39b and 39d is the metal circuit layer 39c. The top layer 39e is a metal ground plane layer that is laminated to the dielectric layer 39d. Part of ground plane layer 39e is etched away to form the antenna structure 120.

The fundamental signal from the low pass filter 122a is fed to a voltage doubler circuit consisting of diodes 123, 124, capacitor 125 and DC and RF ground point 126 which connects to the ground plane 39a. The diodes 123, 124 detect and rectify the incident signal and the resulting charge is stored in the filter capacitor 125 to give it a certain potential or voltage. The supply output voltage applied to the transmission line 128 is applied to a wavetrap 127 comprising a high impedance quarter wave section of transmission line 128 itself shunted by an open circuited low impedance transmission line segment 129 which is also a quarter wavelength long at the fundamental frequency of the signal 17 from the interrogator 12. The supply voltage which is greater than +3 volts is applied to the leads 130, 131 to power the digital circuit 38.

FIG. 4 shows a preferred embodiment of the ROM 28 and modulator 27 of the invention which were illustrated in block diagram form in FIG. 2. The leads 49 and 49a provide power for the various components illustrated in FIG. 4. The ROM and modulator assembly also contain an edge connector 38a which is used during ROM programming only. The connector pins 41a are connected via leads 41b to fusible links 43. These links are connected to and provide permanently programmed parallel loaded voltage inputs to each static shift register 44 and 45. The output of the last shifted register 45 is fed to an and-gate 46 which produces a split phase bit stream signal output 47 for modulating the frequency multiplier 24 illustrated in FIG. 2. The shift registers 44 and 45 are clocked by the variable clock 48 whose frequency is controlled by the positive supply voltage magnitude on lead 49 from the transponder power supply 16 illustrated in FIG. 2. When the transponder 20 is interrogated the supply voltage on lead 49 and lead 49a becomes positive and a time delay which is equal to the RC charging time constant of a resistor 50 and a capacitor 51 is initiated. The voltage on the or-gate inverting input lead 52 will build up exponentially until it reaches the threshold voltage of the or-gate 53 at which time the 8 stage counter 54 will initiate the load and shift sequence since the re-set input on lead 55 will go to the low voltage state. Shift and load control occurs as follows. Just before the supply voltage on lead 49 reaches the or-gate 53 threshold, the counter 54 is held in its re-set condition. At this time, the counter 54 output passes through the or-gate 65 and presents a zero voltage on the load/shift control line 63 which places all shift registers in the load mode. After thresholding of the gate 53 occurs, the counter 54 begins to count up. The non-zero voltage output from the counter 54 produces a digital one on the output line 63 of the or-gate 65 which places the shift registers into shift mode.

When all the data has been sent, the counter will contain the number 144, in the embodiment illustrated in FIG. 4, at which time the gate 66 will produce a digital one signal on its output line 64. This digital one signal will pass through the or-gate 53, re-set the counter 54, re-load the shift registers 44 and 45, and repeat the cycle. The contents of shift registers 44 and 45 are parallel loaded from the data permanently written into the fusible link memory 43. This information is serially shifted into the and-gate 46 from the last shift register 45. And-gate 46 forms a split phase bit stream on the lead 47 as follows. Two fusible links 43 are used to store the data for each frame such as 57–62 in FIG. 5. If a one is presented by shift register 45 to the and-gate 46 then the clock pulse from the variable clock 48 will pass through the and-gate 46 to the output 47. If, however, the shift register 45 presented a zero, then the output on lead 47 would be a zero. In this way frames 58, 59 and 60 would be generated by consecutive shift register data elements of 1,1; 0,1; and 1,0 respectively. Thus, the fusible links 43 connected to even numbered pins 42 control the contents of the first half of the data frames and those with odd numbered pins 42 (except for pin 1) control the contents of the second half of the data frames.

A sample of the signal output waveform 56 on the lead 47 in FIG. 4 is illustrated in FIG. 5. The waveform shows frames 6–11 for illustration, and omits frames 1–5 and frame 12, etc. The code used in the waveform 56 comprises synchronization frames 57 and 58, followed by a "one" frame 59 which signifies the end of the synchronization information and the beginning of data. Data is contained in the remaining frames 60, 61, 62, etc. Each data frame contains one pulse which is timed to occur either in the first half or the second half of the frame to convey a binary zero or one.

Each bi-phase encoded data bit 57–62 represents a digital one or a zero, depending upon whether a high state followed by a low state exists in either the second half or the first half of the bit frame, respectively. Synchronization information in frames 57 and 58 is differentiated from data by the fact that both a digital one and a digital zero are present in each bit frame. This type of synchronization is clearly distinguished from the data and provides a more rapid acquisition by the interrogator clock 111 of FIG. 2 due to the double data frequency present.

The split phase code 56 has the advantage of providing positive synchronization of the interrogator clock 111 in the decoder 111 FIG. 2 and provides a definitive indication of both logic states, i.e. one and zero, without relying on the absence of a signal from the transponder 20 illustrated in FIGS. 1 and 2 to convey a zero. Any number of binary digits may be sent in serial format by the addition serially of additional frames. In the preferred embodiment, a 64-bit binary word is sent over lead 47 during every cycle, plus an 8-frame synchronization code. This requires 144 bits within the shift registers 44, 45. At the end of the previously described interrogation sequence, the transmit power level from the interrogator 12 of FIGS. 1 and 2 is reduced causing the voltage level on lead 49 to drop. Transponder 20 operation then ceases and it reverts to quiescent state.

The ROM 28 comprising the fusible links 43 is encoded by applying a suitably high current between pin 1 designated by 43a and pins 2–129 designated by 43b, using the edge connector 41. This current burns open the respective desired link 43 which permanently changes the state of that serial bit input to the shift register 44, 45. After programming, the edge connector 41 is mechanically broken off along a scribed line to lock in the data in the completed transponder and prevent any further burning or destruction of any other fusible link 43.

Figure 6:
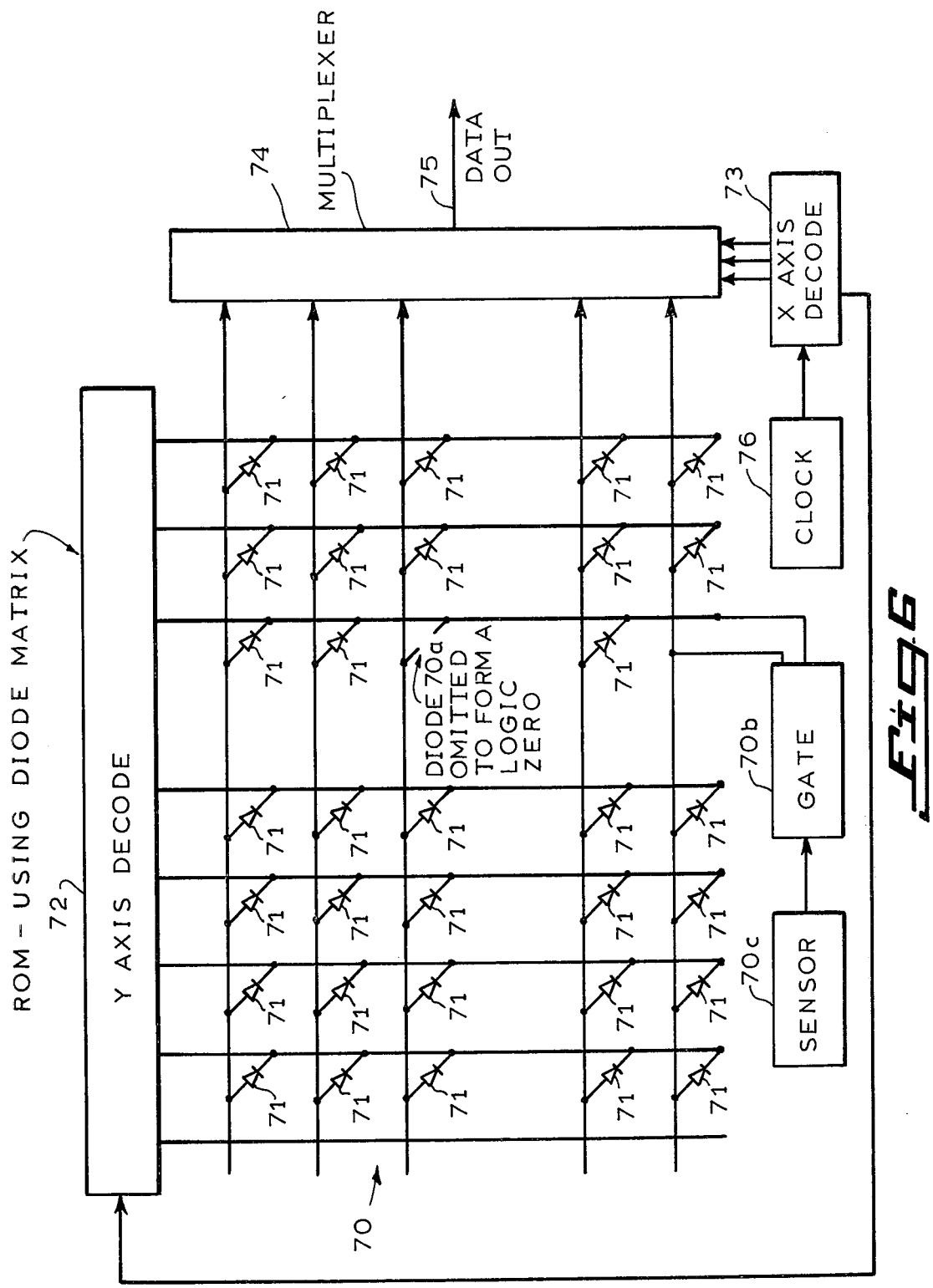
FIG. 6 is a circuit diagram showing an alternate logic circuitry embodiment which may be utilized in the transponder in place of the circuitry illustrated in FIG. 4.

FIG. 6 shows an alternate embodiment of the ROM 28 illustrated in FIG. 2. In the embodiment in FIG. 5 the ROM in FIG. 4 may be regarded as arranged into 133 columns by one row. This data may be rearranged into Y columns and X rows where X times Y is greater than or equal to 133. This alternate ROM comprises a diode matrix 70 containing an array of diodes 71 which replace the fusible links used in FIG. 4. Columns are selected with a shift register within the Y axis decoder 72 which serially supplies a positive voltage in turn to one of the X axis lines 72a. X axis (rows) are selected sequentially by closing a solid state switch within the multiplexer 74 which is driven by the X axis decoder 73 and which connects one of the leads 74a to lead 75. The output on lead 75 represents a serial bit stream which is an ordered readout of the entire memory contents 70 and is identical to the waveform in FIG. 5. A diode 71 may be deleted from the memory matrix 70 to form a digital "zero" as indicated by the space 70a or left in place to form a digital "one". The read-only memory 70 is driven by a clock 76 which is similar to the clock 48 described in FIG. 4.

In the embodiment illustrated in FIG. 6, in the event that information is required regarding the condition or state of some number of external sensors 70C, for example, temperature limits, security seals, etc., the read-only memory 70 may be modified simply as follows: diodes 70a are replaced by logic gates 70b which receive inputs for that memory bit. The gate 70b then delivers information relative to the state of the sensor 70c associated with it when the corresponding position in the array 70 is scanned.

The apparatus of this invention is utilized and the method of this invention is carried out in the following manner. The passive transponder 20 is programmed with a particular identity number. This number is held permanently in the read-only memory 28 of the transponder 20. The transponder 20 is then affixed to a vehicle such as the truck 10. As illustrated in FIG. 1, when the vehicle 10 is driven in proximity to a fixed interrogator 12, that interrogator senses the presence of the transponder 20 and obtains the identity number from the microwave signal beam emitted by the transponder. This transponder signal, encoded with the identity number, is only transmitted to the interrogator receiver section 100 when the transponder 20 is within the microwave beam emitted by the interrogator transmitter antenna 105. The code number is displayed at the display unit 14 for the use of operational personnel and/or entered into a conventional computer (not shown).

The identity number may signify an account number for automatic billing or it may be used for fleet management by keeping track of the location and movements of vehicles in a fleet. It may also be used for security purposes by allowing the entry of only certain authorized vehicles. In such applications, a computer (not shown) could keep and update records and accounts, or compare the vehicle 10 number so obtained to an authorized list and, in real time, control an automatic barrier or gate. This would provide advantages in reducing personnel requirements, increasing speed or throughput, and in increasing accuracy. Alternatively, transponders may be placed on containers for the monitoring or the automatic sorting of cargoes. The gain and beam width of the interrogator antennas determine the maximum range, minimum vehicle spacing and maximum vehicle velocity.

Although the invention has been described in considerable detail with reference to a certain preferred embodiment, it will be understood that variations or modification may be made within the spirit and scope of the invention as described and defined in the appended claims.

What is claimed is:

1. A passive transponder for use with an interrogator, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, control means associated with said signal generating means for modulating said second frequency signal, said control means including a clock adapted to operate at a variable frequency and means for varying the frequency at which said clock operates as a function of the distance between said transponder and said interrogator, power receiving means for receiving the first frequency signal from said interrogator and power supply means associated with said receiving means and said control means for providing operating power to said control means.

2. The passive transponder of claim 1 wherein said means for varying the clock frequency comprises means for reducing the frequency at which said clock operates as the distance between said transponder and said interrogator increases.

3. A passive transponder for use with an interrogator that has signal transmitting and receiving means, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, conrol means associated with said signal generating means for modulating said second frequency signal, said control means including means for controlling the signal to noise ratio of the signal received by said interrogator receiving means as a function of distance between said transponder transmitting means and said interrogator receiving means, power receiving means for receiving the first frequency signal from said interrogator and power supply means associated with said receiving means and said control means for providing operating power to said control means.

4. The passive transponder of claim 3 wherein said signal to noise ratio control means comprises means for reducing the transponder data read out rate as the distance between said transponder transmitting means and said interrogator receiving means increases.

5. A passive transponder for use with an interrogator, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, control means associated with said signal generating means for modulating said second frequency signal, power receiving means for receiving the first frequency signal from said interrogator and power supply means associated with said receiving means and said control means for providing operating power to said control means, said power supply means comprising a stripline structure including a plurality of layers.

6. The passive transponder of claim 5 wherein said stripline structure comprises five alternating electrically conductive and dielectric layers.

7. The passive transponder of claim 6 wherein said five alternating electrically conductive and dielectric layers comprise an electrically conductive metallic ground plane, a dielectric layer, a metallic electrically conductive circuit layer, a dielectric layer and an electrically conductive metallic ground plane.

8. The passive transponder of claim 7 further comprising an antenna with a portion of the antenna being contained on one of said ground planes.

9. The passive transponder of claim 5 further comprising a low pass filter associated with said power receiving means and said power supply means to prevent transmission of harmonics of the first frequency signal generated within said power supply means.

10. A passive transponder for use with an interrogator, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, control means associated with said signal generating means for modulating said second frequency signal, power generating means for receiving the first frequency signal from said interrogator and power supply means associated with said receiving means and said control means for providing operating power to said control means, said power supply means comprising a voltage doubler.

11. A passive transponder for use with an interrogator, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, control means associated with said signal generating means for modulating said second frequency signal, said control means comprising a read only memory, means associated with said read only memory for externally programming said read only memory, power receiving means for receiving the first frequency signal from said interrogator and power supply means associated with said receiving means and said control means for providing operating power to said control means.

12. The passive microwave transponder of claim 11 further comprising a sensor associated with said read only memory.

13. The passive microwave transponder of claim 11 wherein said externally programming means comprises means for preventing alteration of said read only memory.

14. The passive microwave transponder of claim 13 wherein said alteration preventing means comprises means for removing said externally programming means.

15. The passive microwave transponder of claim 14 wherein said removing means comprises means for mechanically breaking off said externally programming means.

16. A passive transponder for use with an interrogator, said transponder comprising receiving means for receiving a first frequency signal from said interrogator, signal generating means associated with said receiving means for converting said first frequency signal to a second frequency signal to be transmitted to said interrogator, transmitting means associated with said signal generating means for transmitting the second frequency signal to said interrogator, control means associated with said signal means for modulating said second frequency signal, said control means including a modulator, said modulator including means for providing a coded waveform with pulses representing synchronization information and data in which synchronization information is distinguished from data, power receiving means for receiving the first frequency signal from said interrogator and power supply means associated with said receiving means and said control means for providing operating power to said control means.

17. The passive transponder of claim 16 wherein said synchronization waveform comprises a waveform with pulses corresponding to both a digital one and a digital zero present in each bit frame.

18. The passive transponder of claim 17 wherein said synchronization information is distinguished from data by a waveform where a digital one is present in the bit frame immediately following the synchronization waveform.

19. A passive transponder for use with an interrogator, said transponder comprising receiving means for receiving a first frequency signal from said interrogator; signal generating means associated with said receiving means for converting said first frequency signal to a second frequency signal to be transmitted to said interrogator; transmitting means associated with said signal generating means for transmitting the second frequency signal to said interrogator; control means associated with said signal generating means for modulating said second frequency signal; said receiving means, said generating means and said transmitting means comprising a harmonic generator comprising a laminated structure with a dielectric layer, a conductive layer on each side of said dielectric layer, one of said conductive layers having an opening exposing said dielectric layer, and means associated with the opening in said conductive layer for resonating at a specified frequency; power receiving means for receiving the first frequency signal from said interrogator; and power supply means associated with said receiving means and said control means for providing operating power to said control means.

20. The passive transponder of claim 19 wherein said resonating means comprises an inductive stub member, a diode, and a capacitor associated with the opening in said conductive layer.

* * * * *